Patented Apr. 15, 1952

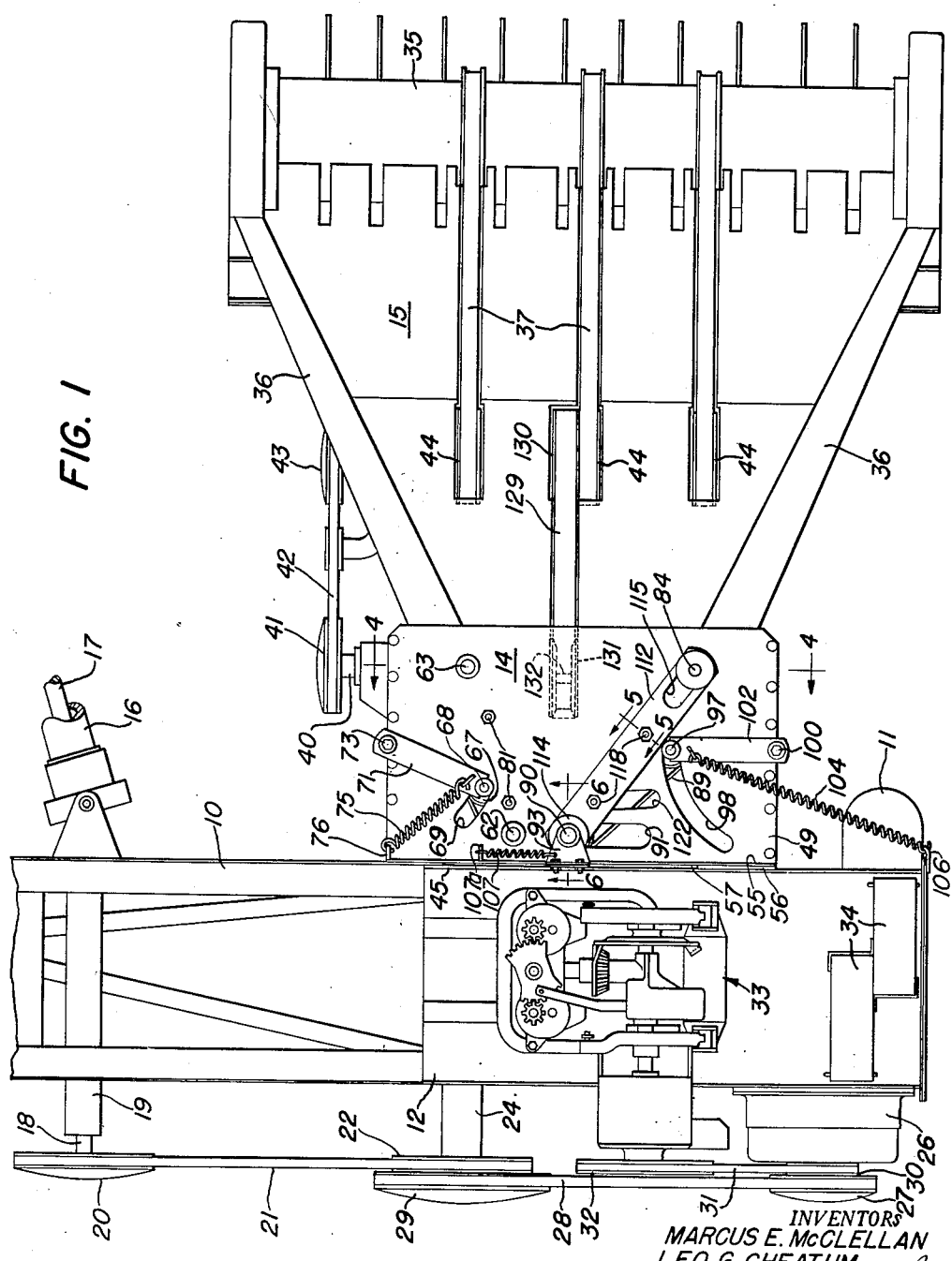

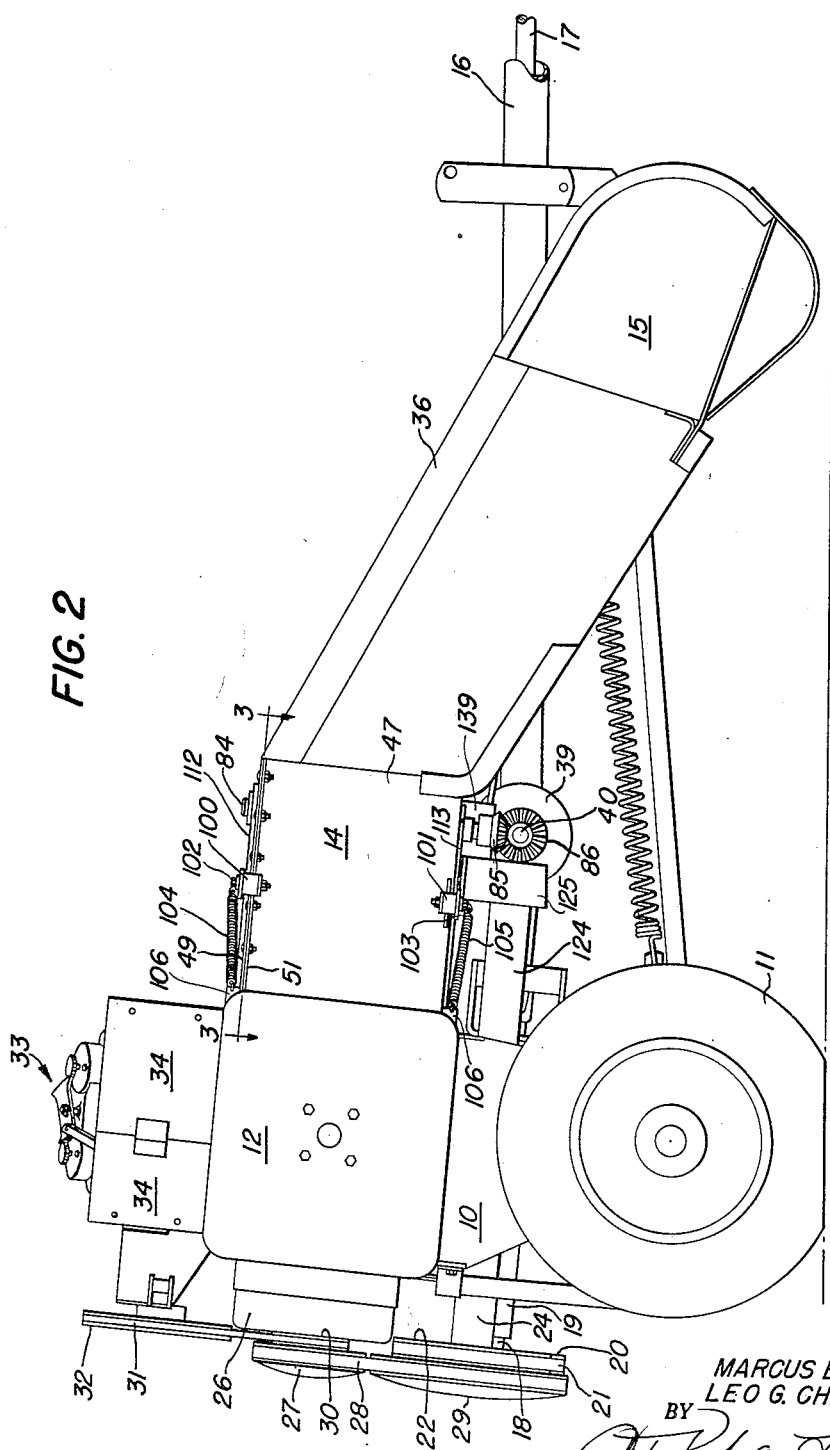

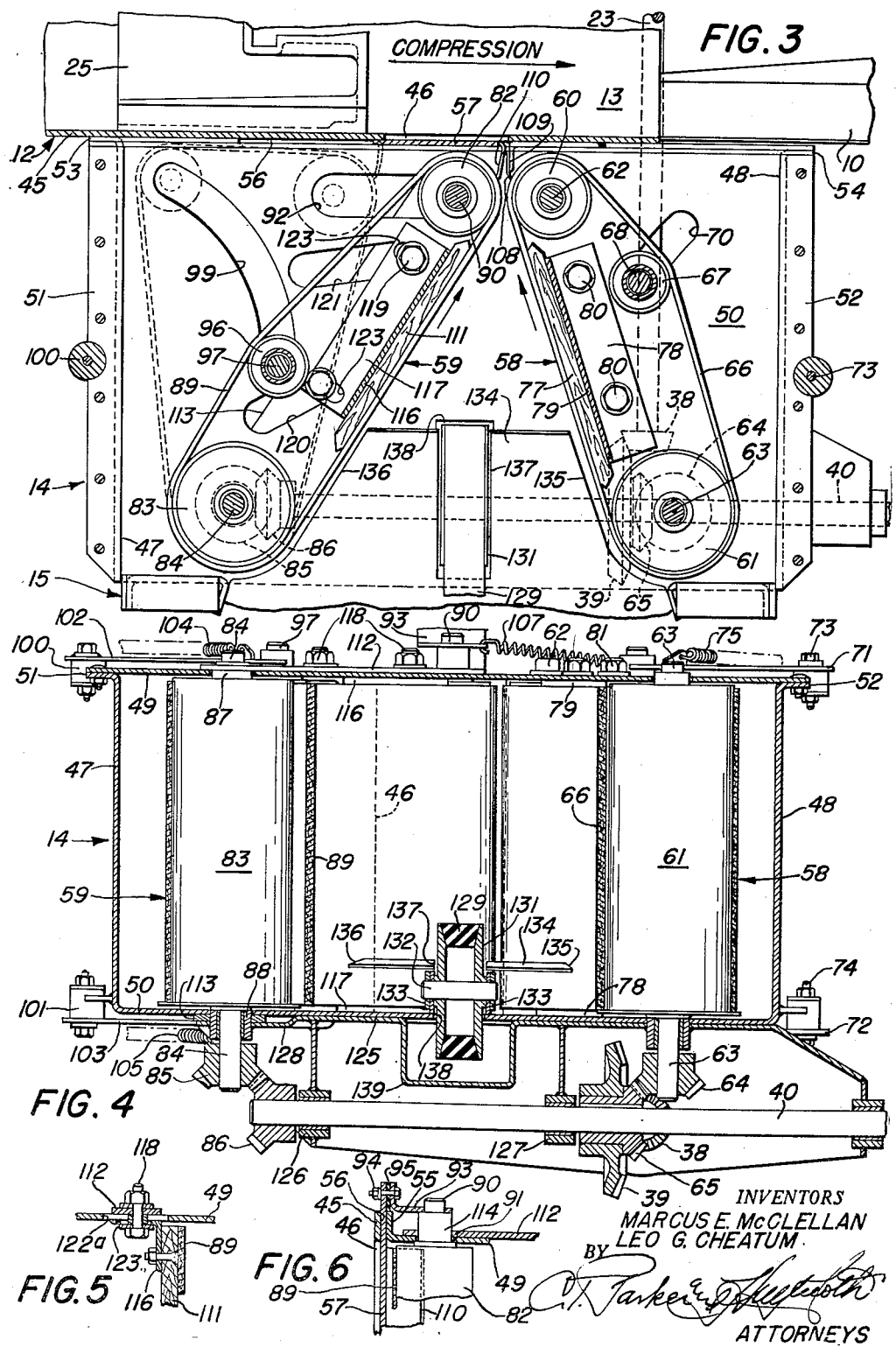

2,592,932

UNITED STATES PATENT OFFICE 2,592,932

PRELIMINARY COMPACTING FEEDING MECHANISM FOR BALERS

Marcus E. McClellan and Leo G. Cheatum, Ottumwa, Iowa, assignors to Deere Manufacturing Co., Dubuque, Iowa, a corporation of Iowa Application March 4, 1949, Serial No. 79,672

15 Claims. (Cl. 100—25)

This invention relates generally to handling or feeding mechanism for material such as hay and relates more particularly to means for preliminarily compacting charges of hay for feeding to the baling chamber of a hay baler.

The usual baler of the pick-up type includes a baling chamber in which bales are formed of hay picked up by pick-up mechanism forming part of the mobile baler. Ordinarily, the pick-up mechanism is of relatively substantial width at the crop-receiving portion thereof and narrows rearwardly somewhat at the point at which it enters or communicates with the baling chamber. Crops fed from the pick-up mechanism to the bale chamber are compressed by a reciprocating plunger into bales having a transverse dimension substantially or materially less than the width of the charge fed by the pick-up mechanism. In certain balers of types heretofore known, the pick-up mechanism has associated therewith means for pre-compressing the quantity of material picked up prior to the feeding of such material to the baling chamber, a feature which is of no little importance in facilitating the feeding of material to the chamber and the minimizing of the number of reciprocating strokes that the plunger must take during the formation of a bale.

The principal object of the present invention relates to an improved form of means for compacting the charge of material prior to the feeding thereof to the baling chamber and involves primarily a pair of feeding elements that converge from a relatively wide throat or mouth associated with the pick-up mechanism to a narrow discharge end associated with the baling chamber. It is an important object of the invention to associate with this mechanism an inlet opening to the baling chamber and to provide this opening as an elongated relatively narrow inlet through which relatively tightly and preliminarily compacted charges of material are fed, thereby cutting down the length and the number of plunger strokes required in the formation of a bale.

An important object of the invention is to arrange the feeding elements in such manner that the discharge portions thereof adjacent the bale case inlet opening are relatively close together normally and at such time close the inlet opening. In this respect, it is a specific object to provide means slidable across the bale case inlet opening and connected to the movable one of the feeding elements to provide a closure temporarily separating the feeding mechanism from the baling chamber during such period as bales already formed are being tied.

In a preferred embodiment of the invention, it is an object to provide at least one of the feeder elements as a plurality of rollers about which is trained a feeder belt and to arrange certain of the rollers for shifting transversely of the path of material feeding, so that the normally closely related portions of the feeder elements may spread apart to provide for the feeding of material therebetween and to the baling chamber. Another object of the invention is to coordinate the shiftability of the feeder elements with respect to each other so that the maximum spacing therebetween conforms to the maximum width of the inlet opening in the bale chamber.

Further important objects of the invention are: The provision of backing means in the form of a board or similar element which functions behind the inner or material-receiving run of the belt; to provide means for maintaining proper tension on the belt regardless of the shifted position thereof; the provision of means for mounting the backing member so that it always occupies substantially the same position with respect to the run of the belt that it backs up; and to provide novel and improved mounting and drive means for the feeding mechanism.

The foregoing and other important objects and desirable features inherent in and encompassed by the invention will become apparent to those skilled in the art as the disclosure of the invention is fully made in the following detailed description and accompanying sheets of drawings, in which Figure 1 is a plan view of a pick-up baler embodying a preferred form of the feeding mechanism;

Figure 2 is a side elevational view of the same;

Figure 3 is an enlarged horizontal sectional view taken substantially on the line 3—3 of Figure 2;

Figure 4 is a transverse sectional view, drawn to the same scale as Figure 3 and taken substantially on the line 4—4 of Figure 1;

Figure 5 is a fragmentary sectional view showing the mounting of one of the backing members, the view being taken substantially on the line 5—5 of Figure 1; and Figure 6 is a fragmentary sectional view showing the mounting of the roller proximate to the bale case and the mounting of the closure member associated with the roller, the view being taken substantially on the line 6—6 of Figure 1.

The preferred embodiment of the feeding mechanism illustrated is primarily of importance as part of a baler of the pick-up type; however, the features of the feeding mechanism may be used in stationary balers and like machines. Accordingly, the illustration of a pick-up baler in the present case is merely by way of example and the various details of the baler apart from the feeding mechanism and its related parts are illustrated and described for orientation only.

The baler chosen for the purposes of illustration comprises a main frame 10 carried on wheels 11 (only one of which appears in the drawings) for advance over the field in a direction toward the right as viewed in Figures 1 and 2.

The rear portion of the main frame extends transverse to the line of travel and carries a transverse bale case 12 which is made up of a plurality of top, bottom and side walls to provide an elongated generally rectangular baling chamber, designated by the numeral 13 in Figure 3. Ahead of the bale chamber 13 is a feeding unit 14 and extending ahead of that is a pick-up unit 15. The baler is propelled over the field by connection to a tractor or similar vehicle and for that purpose may have draft means here shown as a forwardly extending tubular tongue 16 within which is enclosed a propeller shaft 17, the front end of which may be suitably connected to the power take-off shaft of a tractor or other suitable power source. The rear end of the propeller shaft 17 is appropriately connected to a driven shaft 18 journaled in a longitudinal concentric tubular member 19 forming part of the main frame 10. The shaft 18 has keyed thereto at its rear end a sheave 20 by means of which power is transmitted through a belt 21 to a sheave 22 keyed to the rear end of a forwardly extending shaft 23 (Figure 3). This shaft is carried in a longitudinally extending concentric tubular member 24 (Figures 1 and 2).

A bale-forming plunger 25 (Figure 3) is carried for reciprocation lengthwise of the baling chamber 13 and may be driven by any suitable mechanism, many examples of which are known to those versed in the art. In the present case, the numeral 26 designates, in Figures 1 and 2, part of enclosure means for suitable mechanism for driving the plunger 25. Since the details of this mechanism are not important here, they have not been illustrated and will not be described in detail. This mechanism is driven by means of a sheave 27 powered by a belt 28 connected to a second sheave 29 on the rear end of the longitudinally extending shaft 23.

A small sheave 30 is mounted coaxially with the sheave 27 and carries a belt 31 which is trained about a larger sheave 32 for the driving of tying or binding mechanism designated generally by the numeral 33. This mechanism, like other units illustrated generally herein, forms no part of the present invention and need not necessarily be of the type illustrated. In the present case, the tying mechanism 33 is of the wire-tying type and is supplied with wire from a pair of upper wire boxes 34 mounted at the right hand end of the bale case 12. A similar pair of boxes may be located below the bale case for supplying additional wire to the tying mechanism, the details of which are fundamental but not specifically applicable to the instant case, being illustrated in part and referred to merely for the purpose of completing the general picture of the baler.

The pick-up unit 15 is of the type having a transverse pick-up cylinder 35 which is of substantial width relative to the transverse dimension of the feeder unit 14, for which reason the pick-up unit includes a pair of substantially vertical, rearwardly converging side walls 36. The pick-up is therefore adapted to operate on a relatively wide windrow but the quantity of material picked up is substantially narrowed when it reaches that portion of the pick-up that discharges into the feeder unit 14. Rearward transfer of material from the pick-up cylinder 35 to the pick-up unit 14 is effected by a plurality of rearwardly running belts 37, for example, which transmit power to rotate the cylinder 35 and which themselves derive power from the longitudinally extending shaft 23, as will presently appear. The shaft 23 extends forwardly and is provided at its forward end with a bevel pinion 38 (Figures 3 and 4) which is in constant mesh with a bevel pinion 39 keyed to the intermediate portion of a transverse shaft 40. This shaft is visible also in Figures 1 and 2. As shown in Figure 1, the shaft 40 extends to the left and has keyed thereto a sheave 41 by means of which and a belt 42 power is transmitted to a sheave 43 which is in turn keyed to a transverse shaft (not shown) on which are fixed a plurality of transversely spaced sheaves 44 for carrying the pick-up belts 37. The driving means just described, like other units to which only general reference has been had, form no specific part of the present invention and do not require extensive illustration and description.

As previously described generally, the bale case 12 is made up of a plurality of walls to form the baling chamber 13. The transverse front wall of the case is designated by the numeral 45 in Figure 3 and is shown as being formed near the right hand end of the baling chamber 13 with a feed or inlet opening 46. This opening is substantially elongated vertically and is relatively narrow (see also Figure 4), and the reciprocating stroke of the plunger 25 may accordingly be reduced to a length somewhat greater than the width of the opening. For example, the plunger 25 is illustrated in Figure 3 at the end of its retracted position, wherein the leading edge (at the right) of the plunger is slightly to the left (as viewed in Figure 3) of the left hand edge of the opening 46. The direction of movement of the plunger on its compression stroke is indicated by the legend and arrow in Figure 3 and the length of the stroke is such that the leading edge of the plunger moves just past the opposite vertical edge of the opening 46. The details of the mechanism for operating the plunger and its relationship thereof to the remainder of the mechanism are unimportant except in so far as the brief description just made establishes the proposition that a plunger having reciprocating strokes as short as those described must be fed with relatively small charges of material and these charges must either be loosely packed and several in number and tightly packed and few in number. Obviously, the latter alternative is the more efficient, since the number of plunger strokes may be correspondingly reduced and the over-all efficiency of the baler increased.

Accordingly, the novel feeding mechanism is provided for preliminarily compacting the material before it is fed to the bale chamber 13. The feeder unit 14, which houses the feeding mechanism, comprises a pair of opposite vertical side walls 47 and 48, a top wall 49, and a bottom wall or floor 50. In a typical construction, the side walls 47 and 48 and the bottom wall 50 may be formed from a single sheet of metal bent to U-shape as shown in Figure 4, the upper portions of the walls 47 and 48 being flanged at 51 and 52, respectively, and secured to outer marginal edges of the top wall 49. The rear marginal edges of the side walls 47 and 48 are flanged respectively at 53 and 54 and secured to the front wall 45 of the bale case 12 (Figure 3). The rear marginal edge of the top wall 49 is flanged at 55 (Figure 6) and lies along but in closely spaced relation to the upper portion of the front bale case wall 45. The rear marginal edge of the lower wall 50 may be similarly related to a lower portion of the wall 45. This relationship between the wall 45 and the upper and lower feeder unit walls 49 and 50 provides an upper guideway or track 56 and a lower guideway or track (not shown but similar to the guideway 56) for carrying closure means in the form of a door or plate 57 which is operative to alternately open and close the inlet or feed opening 46 in accordance with the functioning of the feeding mechanism, in a manner to be presently described.

The feeding mechanism comprises preferably a pair of feeding elements, a left hand element being designated generally by the numeral 58 and a right hand element being similarly designated by the numeral 59 (reference to "right" and "left" being made with respect to the position of an observer standing behind the machine and facing forwardly).

The left hand feeding element 58 comprises a first roller 60 positioned adjacent the bale case wall 45 and a second roller 61 positioned at the mouth or entrance of the feeding unit 14, or substantially at the junction between the feeding unit and the rear portion of the pick-up 15. The rollers 60 and 61 are mounted on parallel vertical axes; although, the axes are laterally offset in a vertical plane inclined to the plane of the adjacent side wall 48. The roller 60 is rotatably mounted by means of a shaft 62 or its equivalent. The roller 61 is keyed to a vertical shaft 63 which projects downwardly through the floor 50 of the feeder unit or chamber and has fixed thereto a bevel pinion 64. This pinion is in constant mesh with the bevel pinion 65 keyed to the driving shaft 40 previously described.

Another part of the feeding element comprises a flexible endless belt 66 trained about the rollers 60 and 61 and about an idler roller 67. The roller 61 is driven by the shaft 63 so that the inner or material-contacting run of the belt 66 moves in the direction of the arrow in Figure 3; that is, toward the bale case inlet opening 46.

The idler roller 67 is carried on a vertical shaft 68 which projects at its upper and lower ends through arcuate slots 69 and 70 provided respectively in the upper and lower walls 49 and 50 of the feeder unit 14. Upper and lower swinging arms 71 and 72 are respectively mounted on vertical pivot axes 73 and 74 on the upper and lower walls 49 and 50. The opposite ends of the arms are connected to the upper and lower extending portions of the idler roller shaft 68. The upper arm 71 is connected to a tension spring 75 which is in turn anchored to the feeder unit at 76 (Figure 1). The lower arm may be similarly spring-mounted. The arms are thus biased outwardly or in such manner that the idler roller 67 maintains proper tension on the feeder belt 66.

A further part of the left hand feeder element comprises backing means in the form of a board 77 to the lower marginal edge of which is affixed mounting means in the form of an angle member 78 (plainly visible in Figure 3), and to the upper edge of which is affixed similar mounting means in the form of a like angle member 79 (a portion of which is just visible in Figure 4). The mounting member 78 is illustrated as being secured to the floor or bottom wall 50 by means of a pair of bolts 80 and the upper member 79 is secured to the upper wall 49 by a pair of bolts 81.

The right hand feeder unit comprises a first roller 82 positioned adjacent the bale case front wall 45 and closely associated with the roller 60 of the feeding element 58, and a second roller 83 positioned at the forward or material-receiving end of the feeder unit 14. The roller 83 is fixed to a vertical shaft 84 which projects through the bottom wall or floor 50 and which has keyed to its lower end a bevel pinion 85. This pinion is in constant mesh with a bevel pinion 86 keyed to the right hand or outer end of the transverse shaft 40. The upper and lower walls 49 and 50 are provided respectively with bearings 87 and 88 for journaling the shaft 84 and fixing the axis of the roller 83. Since the axis of the roller 83 is fixed, as is the axis of the shaft 63 on which the roller 61 is journaled, the transverse distance between the rollers 61 and 83 is fixed, except in so far as the space varies somewhat by shifting of a feeder belt 89 that is trained about the rollers 82 and 83.

The roller 82 is carried on a vertical shaft 90, or its equivalent, and this shaft is parallel to the shafts 62, 63 and 84; although, its relationship to the axis of the shaft 84 is such that a vertical plane including its axis and that of the shaft 84 is inclined to the adjacent side wall 47, the relationship being such that the inner or material-contacting runs of the belts 66 and 89 converge from the forward or material-receiving end of the feeder unit toward the rear or material-discharge end of the feeder unit. The mounting of the roller 82 and shaft 90 in the feeder unit is such that the rollers 60 and 82 are at times relatively close together, being substantially tangent to each other and spaced at such times only sufficiently far apart to prevent interference between the adjacent runs of the belts.

The roller 82 is mounted for transverse movement away from and back toward the roller 60, and this mounting of the roller is accomplished by means of guides in the form of slots 91 and 92 provided respectively in the upper and lower walls 49 and 50. These slots are substantially parallel to the transverse front bale case wall 45 and the length of the slots is such that transverse movement of the roller 82 is substantially in conformance with the transverse or shorter dimension of the inlet opening 46, opposite ends of the slots 91 and 92 thus providing stops for limiting the roller. As best shown in Figures 1 and 6, the closure or door-plate 57 projects upwardly beyond the upper wall 49 and carries means for mounting the upper end of the roller shaft 90. This means takes the form of an angle member 93 secured to the upwardly extending portion of the closure plate 57 by a pair of bolts 94. A piece of flexible material 95, such as rubber-impregnated fabric, is interposed between the member 93 and the closure 57 to give some resiliency to the mounting. Although not shown, the lower end of the roller shaft 90 is similarly mounted on the lower portion of the door-plate 57.

From the description thus far, it will be seen that the feeder elements 58 and 59 normally occupy the positions indicated in full lines in Figure 3; that is, they occupy these positions when material is not being fed thereto by the pick-up and conveying units. Since the width of the pick-up cylinder 35 is substantially greater than the transverse distance between the rollers 61 and 83, and since the side walls 36 of the pick-up converge rearwardly, the charge of material picked up will be considerably compressed laterally and at the same time will be increased somewhat in vertical dimension, wherefore the feeding elements 58 and 59 are made preferably substantially the height indicated. As the material is fed rearwardly by the combined action of the inner runs of the feeder belts 66 and 89 and the rearwardly conveying action of the pick-up mechanism, the charge will be still further compressed or compacted laterally and its vertical dimension will increase. The upper and lower walls 49 and 50 establish limits on the increase of the charge in a vertical direction, and since the vertical spacing between the upper and lower walls is in conformance with the vertical or longer dimension of the feed opening 46, the charge is, at least in its vertical dimension, acceptable by the feed or inlet opening. Further, since the length of the slots 91 and 92 limits movement of the roller 82 away from the roller 60 to an extent in which the maximum spacing therebetween is substantially equal to the transverse or shorter dimension of the opening 46, the charge in its transverse dimension is acceptable by the opening 46. It will be understood, of course, that when reference is made to the spacing between the rollers 60 and 82, there must be taken into consideration the thicknesses of the belts 66 and 89 at the inner portions of the rollers.

The slots 91 and 92, in addition to limiting the transverse movement of the roller 82, also confine movement of the roller to a path parallel to the plane of the front wall 45 of the bale case 12. However, inasmuch as other requirements are set up in addition to mere guiding of the roller 82, the invention contemplates the provision of means for controlling the movement of the roller 82 and the maintaining of proper tension on the feeder belt 89. For this purpose, theere is provided an idler roller 96 which is carried on a shaft 97 having upper and lower ends projecting respectively through the upper and lower walls 49 and 50 and guided by guide means including slots 98 and 99 provided respectively in these walls. The slots 98 and 99 are arcuate about a vertical axis which is common to upper and lower pivot or mounting means 100 and 101, respectively. These mounting means are carried at the right hand side wall 47 in a manner similar to the mounting of the pivots 73 and 74 at the left hand side of the feeder unit 14. The pivot mounts 100 and 101 respectively carry swinging arms 102 and 103 suitably connected respectively to upper and lower projecting ends of the idler roller shaft 97. The roller 96 is in length preferably equal to the length of either of the rollers 82 or 83 and engages the inside of the outer run of the belt 89 and is biased for movement toward the outer ends of the arcuate slots 98 and 99 by relatively long tension springs 104 and 105, these springs being connected in any suitable manner to outer portions of the bale case 12, as indicated at 106 in Figure 1.

The feeding elements 58 and 59 are yieldably urged or biased toward the full-line position of Figure 3 by means including upper and lower tension springs, only the upper of which is visible at 107 in Figures 1 and 4. One end of the spring 107 is suitably connected to a bracket 107aa on the bale case and the other end of the spring is connected to the mounting angle member 93 for the upper end of the roller shaft 90. It will thus be seen that compacting of the material fed between the feeder elements 58 and 59 is dependent upon the springs in the upper and lower tensioning means represented by the means 107, this spring and its companion spring operating always to urge the roller 82 toward the roller 60 so that the inner or material-contacting runs of the belts 66 and 89 tend to converge. The angle of convergence varies, of course, as the roller 82 moves outwardly in its slots 91 and 92; although even at its maximum position, the roller 82 is still closer to the roller 60 than the roller 83 is to the roller 61. Hence, the material-receiving end or throat of the material passage between the feeder elements will always be wider than the transverse distance at the discharge end of the feeding unit. In other words, the width of the throat of the feeding unit is substantially constant and is fairly well in conformance with the rear end of the pick-up unit 15, whereas the maximum width of the discharge end of the feeding unit cannot substantially exceed the transverse or shorter dimension of the inlet opening 46. As a matter of fact, the positioning of the roller 60 is such that the portion of the belt 66 movable thereabout at the inlet opening is substantially in longitudinal alignment with the proximate longer edge of the opening; and the roller 82, when moved to its maximum outward position, disposes the associated portion of the belt 89 in substantially longitudinal alignment with the opposite longer edge of the opening 46. Therefore, the material received by the feeder unit will be preliminarily compacted or compressed to a size acceptable by the opening 46 and of such density as to require only relatively short and relatively few strokes of the plunger for compression of these charges into a completed bale.

The relationship between the roller 60 and the proximate side of the feed opening 46 is further characterized by the provision of a vertical scraper means in the form of a blade 108 fixed to an angle member 109 which is in turn fixed to the bale case wall 45 along the proximate edge of the opening 46. Scraper means is also provided for the portion of the belt that passes around the roller 82, this means including a scraper blade 110 preferably formed as a forward extension on the door-plate 57. The relationship of the scraper portions 108 and 110 to the belts 66 and 89 may be as illustrated in Figure 3 or may be otherwise suitably arranged to accomplish the purpose of keeping the belts free of lengths of straw that tend to adhere thereto.

The feeder 59, like the feeder 58, includes means for backing up the inner or material-contacting run of the belt 89. This backing means comprises a board 111 which is substantially coextensive with the intermediate portion of the belt 89 and which is carried at its upper and lower ends by means including upper and lower control arms 112 and 113 respectively. Since the two arms 112 and 113 are similar, and further since the lower arm is not completely visible in all details, only the upper arm will be described, it being understood that whatever is said in connection with the upper arm applies also to the lower arm.

The arm 112 is provided with a suitable pivotal connection 114 (Figures 1 and 6) with the upper end of the shaft 90 of the roller 82. The other end portion of the arm 112 has a combined sliding and pivotal connection with the upwardly projecting end of the shaft 84 for the roller 83. This connection includes a guide in the form of a slot 115 in the arm. The slot is elongated lengthwise of the arm and provides for both swinging of the arm and forward shifting of the arm relative to the roller shaft 84 as the roller 82 carries the arm 112 outwardly when moving away from the roller 60. The necessity for the elongated slot 115 is dictated by the fact that the distance between the shafts 84 and 90 varies as the roller 82 shifts back and forth in its mounting slots 91 and 92.

In order that the backing board 111 will maintain its relationship to the inner or material-contacting run of the belt 89, it is desirable that the member be mounted on the arms 112 and 113 for swinging therewith. A preferred type of mounting of the board 111 on these arms comprises upper and lower angle members 116 and 117. A portion of the upper mounting member 116 appears in section in Figure 3, as does a portion of the upper mounting member 79 for the backing board 77 of the feeder element 58, since the sectional plane that exposes the interior of the feeder house as depicted in Figure 3 cuts just below the upper wall 49.

The upper member 116 is mounted on the upper control arm 112 by means of a pair of bolts 118 and the lower member 117 is connected to the lower control arm 113 by means of a pair of bolts 119. Since the bolts 119 pass through the lower wall or floor 50 of the feeder unit, the floor is provided with a pair of angularly related slots 120 and 121, these slots being so disposed as to accommodate shifting of the backing board 111 as carried by the control arms 112 and 113 when the roller 82 changes position. The upper wall 49 is provided with a similar pair of slots, one of which appears at 122 in Figure 1 and the other at 122a in Figure 5. Each of the members 116, 117 may be provided with slots 123 (Figures 3 and 5) to accommodate adjustment of the backing board 111 with respect to the inner or material-contacting run of the belt 89.

The main frame 10 includes a forward supporting portion 124 which includes a transverse sheet metal piece 125 secured to the lower wall or floor 50 of the feeder unit and having depending portions 126 and 127, including bearings, for supporting the transverse shaft 49 (Figure 4). The sheet metal piece 125 is shaped at 128 to accommodate the lower control arm 113 (also Figure 4).

As further means to assist the transfer of material from the pick-up 15 to the feeding mechanism, there is provided crop-moving means comprising a belt 129 and a pair of sheaves 130 and 131 (Figure 1). The sheave 130 is coaxial with and mounted for rotation adjacent the intermediate pick-up sheave 44, the three sheaves 44 and the sheave 130 being simultaneously driven by the shaft (not shown) on which the driving sheave 43 is fixed. The rearward sheave 131 is located within the forward portion of the feeder unit and is carried on a short transverse shaft 132 which is above and slightly to the rear of the transverse shaft 49. The shaft 132 is carried at each of its opposite ends in brackets 133 connected between the bottom plate or floor 50 and a rearwardly extending, upwardly inclined plate 134 spaced slightly above the intermediate portion of the floor 50 and having opposite sides 135 and 136 generally conforming respectively to the inner or material-contacting runs of the belts 66 and 89. This plate is slotted at 137 and the floor or bottom plate 50 is likewise slotted at 138 to accommodate the sheave 131. Further, the bottom sheet metal piece 125 is shaped to form a trough 139 (Figure 4) within which run the lower portion of the sheave 131 and the lower run of the conveyor belt 129.

*Operation*

The operation of the baler in general follows that of the usual mobile pick-up baler. That is, the baler is drawn over the field by a tractor or other appropriate vehicle and the pick-up mechanism 15 operates to pick up hay that has previously been formed into windrows. The hay is conveyed rearwardly and upwardly toward the feeder unit 14 by means of the conveyors or belts 37 and 129, the width of the material picked up being gradually narrowed by the side walls 36 of the pick-up unit as the material moves rearwardly. As the material enters the feeding unit 14, it is simultaneously engaged by the inner runs of the belts 66 and 89 of the feeding elements 58 and 59 and by the rearward portion of the belt 129. The feeder elements 58 and 59 are under action of the tension spring 107 and consequently have a compressing or compacting action on the material, the feeder elements being normally in the positions indicated in full lines in Figure 3. The size and density of the charge of material received between the feeding elements 58 and 59 will, of course, be considerably greater than can be forced between the closely proximate rolls 60 and 82, with the result that the roller 82 yields outwardly against the loading of the spring 107. Since the arms 102 and 103 that control the idler roller 96 are tensioned by the springs 104 and 105, proper tension will be maintained on the belt 89. At the same time, the normally closed feed opening 46 will be uncovered by the closure door 57 in proportion to the movement of the roller 82 outwardly or to the right hand side of the machine. Because of the slots 91 and 92, the path of the roller 82 will be confined as previously indicated. Also, the backing board 111, being mounted on the control arms 112 and 113 will always maintain substantially its position with respect to the inner or material-contacting run of the belt 89. Inasmuch as the backing member 111 is mounted on the arms 112 and 113 which in turn are connected to the roller shaft 90, the tension of the spring 107 reacts substantially on the entire feeder element 59 to maintain a compressing or compacting action on the charge of material. At the same time, the inner or material-contacting runs of the belts 66 and 89 are moving in the direction of the arrows in Figure 3 and the compacted or compressed material is moved through the inlet or feed opening 46 into the path of the reciprocating plunger 25; and, after a sufficient number of charges have been fed to the baling chamber 13, a bale is completed, tied and ejected, the latter phases of the operation of the baler being merely a final incident to the baling operation and not specifically related to the improved feeding mechanism.

Various features and objects of the invention not specifically enumerated above will undoubtedly occur to those versed in the art, as likewise will numerous modifications and alterations in the preferred structure illustrated, all of which may be achieved without departing from the spirit and scope of the invention as defined in the appended claims.

What is claimed is:

1. In a baler or the like having a bale case provided with a wall in which is formed a relatively long and narrow, generally rectangular feed opening, the improvement residing in feed mechanism for compacting a relatively wide charge of material to a size acceptable by the opening, said mechanism comprising: a first feed-assistance means including an inner or material-contacting portion lying generally along one long edge of the feed opening and extending away therefrom in the direction from which material is fed; a second feed-assistance means including first and second rollers and a belt trained thereabout and arranged so that the belt has an inner or material-contacting run inclined to the aforesaid portion of the first means so that said run and said portion converge toward the feed opening; means carrying the first roller adjacent the feed opening on an axis generally paralleling the long dimension of said opening and providing for shifting of said roller in a path parallel to the feed opening wall and across the short dimension of the opening between a first position close to the material contacting portion of the first feed-assistance means and overlying the opening, and a second position spaced from said portion and uncovering said opening; means carrying the second roller on a fixed axis parallel to and spaced from the first roller axis, whereby the distance between said axes will vary as the first roller changes position, because of the aforesaid guide means; means operative to urge the first roller to its first position but effective to provide for movement of said first roller to accommodate material being fed by the feed mechanism; means carrying part of the belt and tensioned and mounted for movement to accommodate changes in belt length as the first roller changes position; backing means behind the inner run of the belt; and means mounting the backing means for movement in conformity to changes in position of the first roller.

2. In a baler or the like having a bale case provided with a wall in which is formed a relatively long and narrow, generally rectangular feed opening, the improvement residing in feed mechanism for compacting a relatively wide charge of material to a size acceptable by the opening, said mechanism comprising: a first feed-assistance means including an inner or material-contacting portion lying generally along one long edge of the feed opening and extending away therefrom in the direction from which material is fed; a second feed-assistance means including rollers and a belt trained thereabout and arranged so that the inner or material-contacting run of the belt and the aforesaid portion of the first means converge toward the feed opening, said second means including a roller adjacent, generally paralleling and substantially equal in length to the long dimension of the feed opening to carry the belt for cooperation with said portion of the first means at the feed opening; means mounting said roller for movement back and forth in a path across the short dimension of the feed opening between a first position in which said roller and belt are closely adjacent to the first means portion, and a second position in which said roller and belt are spaced along said path from said first means portion; means operative to urge the roller toward its first position but effective to provide for movement of the roller and belt to accommodate material; and a member mounted for movement back and forth with said roller and cooperative with the feed opening to close said opening when the roller is in its first position and to uncover said opening when the roller is in its second position.

3. The invention defined in claim 2, further characterized in that: the mounting of said member includes a guide disposed parallel to the wall in which the feed opening is provided, whereby said guide carries said member for opening and closing in sliding-door fashion.

4. The invention defined in claim 2, further characterized in that: said member has a closing edge portion lying lengthwise of the long dimension of the feed opening and adapted to cooperate with opposite long edges of the feed opening; and stop means are provided for limiting movement of said member so that its closing edge lies substantially along one long edge of the feed opening when the roller is in its first position and lies substantially along the other long edge of the feed opening when the roller is in its second position.

5. In a baler or the like having a bale case provided with a wall in which is formed a relatively long and narrow, generally rectangular feed opening, the improvement residing in feed mechanism for compacting a relatively wide charge of material to a size acceptable by the opening, said mechanism comprising: first and second feeders, including rollers and belts, arranged to operate with inner or material-contacting runs of the belts converging toward the feed opening; the first of said feeders including a roller closely adjacent and parallel and substantially equal in length to one long edge of the feed opening to carry the first feeder belt at said one long edge; said second feeder including a roller generally parallel and substantially equal in length to the first roller and adjacent the feed opening to carry the second belt for cooperation with the first belt at the feed opening; means mounting the second roller for movement back and forth in a direction across the short dimension of the opening between a first position relatively close to the first roller and obstructing the feed opening and a second position relatively remote from the first roller and exposing the feed opening; means operative to urge the second roller to its first position but effective to provide for movement of said second roller to accommodate material being fed by the feeders; a pair of members disposed lengthwise of the rollers and having portions lying generally along the proximate long edge of the feed opening and respectively cooperative with the feeder belts to act as scrapers for said belts; and means mounting said members for relative separation and closing consistent with movement of the second roller between its first and second positions, said members being cooperative to close the feed opening when the second roller is in its first position and separable to uncover the feed opening when the second roller is in its second position.

6. In a baler or the like having a bale case provided with a wall in which is formed a relatively long and narrow, generally rectangular feed opening, the improvement residing in feed mechanism for compacting a relatively wide charge of material to a size acceptable by the opening, said mechanism comprising: first and second feed-assistance devices, each including a material-contacting element, and said elements being arranged to converge toward the feed opening, each element having a portion movable adjacent the feed opening about an axis generally lengthwise of said opening; means mounting at least one of said elements and its portion for movement back and forth with respect to the other element and its portion in a direction across the short dimension of the feed opening, said portions in one position thereof being relatively close together and substantially obstructing said opening in another position being separated and uncovering the opening; means urging said portions to closing position but effective to provide for separation thereof to accommodate material received between the elements; a pair of separable members arranged lengthwise of the opening, one associated with each movable portion to act as a scraper therefor; and means mounting said members for cooperation with each other and with the feed opening to alternately open and close the feed opening consistent with relative closing and separation of said feed-assistance portions.

7. Feed mechanism for a baler or the like, comprising a pair of supports including portions spaced apart in generally parallel planes to provide a passage for the feeding of material from a receiving end to a discharge end; a pair of feed-assistance devices in said passage having material-contacting elements extending between the support portions in planes normal to the planes of said portions and converging from the receiving end to the discharge end of the passage; at least one of said devices including a pair of rollers spaced apart and disposed respectively at the receiving and discharge ends of the passage and carried on generally parallel axes normal to the planes of the support portions, and a belt trained about the rollers and having its inner run providing the material-contacting element for that device; means mounting the discharge roller for shifting back and forth in a generally straight path transverse to the path of material feeding, including a coaxial portion on the roller and a transversely elongated guide on one of the support portions; means fixing the axis of the receiving roller, whereby the distance between the roller axes will vary as the discharge roller shifts; means providing an arm pivoted coaxially with one roller and having lost-motion connection coaxial with the other roller for swinging of said arm as the discharge roller shifts; a backing member behind the material-contacting run of the belt and mounted on said arm for swinging therewith; and means for accommodating variations in the length of the belt incident to shifting of the discharge roller.

8. Feed mechanism for a baler or the like, comprising a pair of supports including portions spaced apart in generally parallel planes to provide a passage for the feeding of material from a receiving end to a discharge end; a pair of feed-assistance devices in said passage having material-contacting elements extending between the support portions in planes normal to the planes of said portions and converging from the receiving end to the discharge end of the passage; at least one of said devices including a pair of rollers spaced apart and disposed respectively at the receiving and discharge ends of the passage and carried on generally parallel axes normal to the planes of the support portions, and a belt trained about the rollers and having its inner run providing the material-contacting element for that device; means mounting the discharge roller for shifting back and forth in a generally straight path transverse to the path of material feeding, including a coaxial portion on the roller and a transversely elongated guide on one of the support portions; means fixing the axis of the receiving roller, whereby the distance between the roller axes will vary as the discharge roller shifts; means including an arm extending lengthwise between the roller axes and having opposite end portions provided with connections respectively to the mounting means for the discharge roller and to the axis-fixing means for the receiving roller, one of said connections including a pivot coaxial with the proximate one of the rollers, and the other of the connections including lost-motion means effective lengthwise of the arm; a backing member behind the material-contacting run of the belt and mounted on said arm for swinging therewith; and means for accommodating variations in the length of the belt incident to shifting of the discharge roller.

9. Feed mechanism for a baler or the like, comprising a pair of supports including portions spaced apart in generally parallel planes to provide a passage for the feeding of material from a receiving end to a discharge end; a feed-assistance device in said passage including a pair of rollers spaced apart and disposed respectively at the receiving and discharge ends of the passage and carried on generally parallel axes normal to the planes of the support portions, and a belt trained about the rollers and having its inner run adapted to contact material; means mounting the discharge roller for shifting back and forth in a generally straight path transverse to the path of material feeding, including a coaxial portion on the roller and a transversely elongated guide on one of the support portions; means fixing the axis of the receiving roller, whereby the distance between the roller axes will vary as the discharge roller shifts; means providing an arm pivoted on the coaxial portion of the mounting means for the discharge roller and having lost-motion connection adjacent to the receiving roller for swinging of said arm as the discharge roller shifts; a backing member behind the material-contacting run of the belt and mounted on said arm for swinging therewith; and means for accommodating variations in the length of the belt incident to shifting of the discharge roller.

10. In a baler or the like having a bale case provided with a wall in which is formed a relatively long and narrow, generally rectangular feed opening, the improvement residing in feed mechanism for compacting a relatively wide charge of material to a size acceptable by the opening, said mechanism comprising: first and second feeders, including rollers and belts, arranged to operate with inner or material-contacting runs of the belts converging toward the feed opening; the first of said feeders including a roller closely adjacent and parallel and substantially equal in length to one long edge of the feed opening to carry the first feeder belt at said one long edge; said second feeder including a roller generally parallel and substantially equal in length to the first roller and adjacent the feed opening to carry the second belt for cooperation with the first belt at the feed opening; means mounting the second roller for movement back and forth in a direction across the short dimension of the opening between a first position relatively close to the first roller and obstructing the feed opening and a second position relatively remote from the first roller and exposing the feed opening, said mounting means including provision for guiding movement of said second roller in a path parallel to the wall in which the feed opening is formed; means operative to urge the second roller to its first position but effective to provide for movement of said second roller to accommodate material being fed by the feeders; stop means for limiting movement of the second roller to define its second position as one in which the inner run of the second belt at said roller substantially coincides with the other long edge of the feed opening; and means is provided for tensioning the second belt during movement of said second roller.

11. The invention defined in claim 10, further characterized in that: the mounting and guide means includes a member carried for movement with the second roller and arranged to close and open the feed opening consistent with changes in position of the second roller.

12. The invention defined in claim 11, further characterized in that: said member includes a portion running lengthwise of the second roller and spaced in parallelism thereto sufficient to accommodate the carried portion of the second belt so as to act as a scraper for said belt.

13. In a baler or the like having a bale case provided with a wall in which is formed a relatively long and narrow, generally rectangular feed opening, the improvement residing in feed mechanism for compacting a relatively wide charge of material to a size acceptable by the opening, said mechanism comprising: a first feed-assistance means including an inner or material-contacting portion lying generally along one long edge of the feed opening and extending away therefrom in the direction from which material is fed; a second feed-assistance means including first and second rollers and a belt trained thereabout and arranged so that the belt has an inner or material-contacting run inclined to the aforesaid portion of the first means so that said run and said portion converge toward the feed opening; means carrying the first roller adjacent the feed opening on an axis generally paralleling the long dimension of said opening and providing for shifting of said roller in a path parallel to the feed opening wall and across the short dimension of the opening between a first position close to the material-contacting portion of the first feed-assistance means and overlying the opening, and a second position spaced from said portion and uncovering said opening; means carrying the second roller on a fixed axis parallel to and spaced from the first roller axis, whereby the distance between said axes will vary as the first roller changes position, because of the aforesaid guide means; means operative to urge the first roller to its first position but effective to provide for movement of said first roller to accommodate material being fed by the feed mechanism; and means carrying part of the belt and tensioned and mounted for movement to accommodate changes in belt length as the first roller changes position.

14. In a baler or the like having a material-receiving chamber including a wall provided with a feed opening: feed mechanism therefor comprising a pair of spaced apart, generally parallel fixed walls and a pair of spaced apart relatively movable walls defining generally a box-like throat through which material may be fed along a path substantially normal to the aforesaid wall in which the feed opening is provided, one of said selectively movable walls including a shaft and a driving roller carried thereby, and a second shaft and driven roller carried thereby, a third shaft and an idler roller carried thereby, and a feed belt trained about the rollers, all between said fixed walls; each shaft projecting exteriorly of one of the fixed walls; first movable support means carrying the driven roller shaft; movable means separate from the first movable support means and carrying the idler roller shaft; one of the fixed walls having slot means transverse to the path of material feeding and through which the driven roller shaft and idler roller shaft project, whereby said driven and idler rollers and belt carried thereby may shift transversely relative to the other relatively movable wall; means journaling and fixing the axis of the driving roller shaft in one of the fixed walls; means exteriorly of the fixed walls providing a drive connection for the driving roller shaft; means exteriorly of the fixed walls and connected to the driven roller shaft for biasing the driven roller toward the other relatively movable wall; and means exteriorly of the fixed walls and connected to the idler roller shaft for maintaining tension on the belt during all positions of the belt as carried by the driven and idler rollers.

15. The invention defined in claim 14, further characterized in that: backing means is provided between the fixed walls for backing up the belt; one of said fixed walls has slot means therein opening to the backing means; and means is connected to the driven roller shaft exteriorly of the fixed walls for carrying the backing means, including a portion extending through said last named slot means for connection to the backing means, whereby said backing means may move transversely with the driven roller.

MARCUS E. McCLELLAN.
LEO G. CHEATUM.

REFERENCES CITED

The following references are of record in the file of this patent:

UNITED STATES PATENTS

| Number | Name | Date |
|--------|------|------|
| 775,481 | Thomas | Nov. 22, 1904 |
| 1,289,004 | Rosenthal | Dec. 24, 1918 |
| 1,456,265 | Brooks | May 22, 1923 |
| 1,624,703 | Witte | Apr. 12, 1927 |
| 2,381,620 | Russell | Aug. 7, 1945 |
| 2,464,684 | Hill | Mar. 25, 1949 |